United States Patent [19]
Newkirk et al.

[11] Patent Number: 5,006,197
[45] Date of Patent: Apr. 9, 1991

[54] MULTIPLE FIXTURE APPARATUS FOR FUSION BONDING

[75] Inventors: Raymond K. Newkirk, Plymouth; William G. West, Edina, both of Minn.

[73] Assignee: Forward Technology Industries, Inc., Minneapolis, Minn.

[21] Appl. No.: 375,045

[22] Filed: Jul. 3, 1989

[51] Int. Cl.⁵ .............................................. B32B 31/00
[52] U.S. Cl. ................... 156/514; 156/250; 156/309.9; 156/583.1; 493/203; 493/213
[58] Field of Search ............... 156/69, 250, 261, 304.6, 156/309.9, 499, 513, 514, 583.1; 83/171; 219/229; 220/85 F, 855 P; 493/203, , 213

[56] References Cited

U.S. PATENT DOCUMENTS

| | | |
|---|---|---|
| 2,347,737 | 5/1944 | Fuller . |
| 3,286,010 | 11/1966 | Van Groningen . |
| 3,450,190 | 6/1969 | Mittermaier et al. . |
| 3,809,737 | 5/1974 | Rogers et al. . |
| 4,015,920 | 4/1977 | Niederst et al. . |
| 4,070,429 | 1/1978 | Uhlig . |
| 4,083,671 | 4/1978 | Niederst et al. . |
| 4,468,368 | 8/1984 | Hafele . |
| 4,692,135 | 9/1987 | Johnson .......................... 156/515 X |
| 4,872,935 | 10/1989 | Newkirk et al. ............. 156/583.1 X |

*Primary Examiner*—David A. Simmons
*Assistant Examiner*—James J. Engel, Jr.
*Attorney, Agent, or Firm*—Haugen and Nikolai

[57] ABSTRACT

A system for fusion bonding several attachments to a relatively large and bulky thermoplastic article employs means for fixedly securing the article, and a movable fixture selectively positionable relative to the thermoplastic article. The fixture includes a base plate held stationary during bonding operations, a gripping device supporting the thermoplastic article and longitudinally reciprocable relative to the base plate, and a pair of arms supporting a platen or other heating tool, also longitudinally reciprocable relative to the base plate. The tool supporting arms further can be pivoted to move the heating tool between an aligned position between the thermoplastic attachment and fixed thermoplastic article, and a remote, withdrawn position, to allow longitudinal movement of the attachment into engagement with the thermoplastic article, following use of the heating tool to simultaneously fuse selected surface portions of the thermoplastic article and attachment. In one embodiment, the tool support arms are constrained by a pair of bushings and coil springs to move longitudinally with the thermoplastic attachment when aligned with it. Another embodiment employs independent linear actuators for the tool and the attachment.

16 Claims, 5 Drawing Sheets

MULTIPLE FIXTURE APPARATUS FOR FUSION BONDING

BACKGROUND OF THE INVENTION

The present invention relates to the fusion bonding of articles constructed of plastic, and more particularly to apparatus for performing multiple fusion bonds to join a plurality of workpieces to a fixed, relatively large and bulky workpiece.

Fusion bonding, also known as hot plate welding, is a well known technique for forming strong bonds between plastic members. Generally, the articles to be bonded are positioned spaced apart from one another with the surface portions to be bonded aligned and facing one another. A heating platen is interposed between the articles in contact with the surfaces to be bonded, thus to form a fused or plasticized layer in the plastic comprising the articles. Immediately after heating, the platen is withdrawn and the articles are brought together under pressure and allowed to cool, forming the fusion bond.

One particularly advantageous but challenging fusion bonding operation is the attachment of a tubular spout to a container, for example a gas tank in which the spout is to be employed as a filler spout for the tank. Previously, a bore was first formed in the container by drilling, then the spout secured to the container in a rim area about the bore. Under this approach, however, the gas tank or other container is subject to contamination in the form of plastic chips or shavings deposited during the drilling operation. This kind of contamination in a gas tank can cause damage to the vehicle. In accordance with an invention described in pending U.S. Pat. No. 4,872,935, filed Nov. 28, 1988, the contamination is virtually eliminated when the boring operation and platen heating operation are performed as a single step employing a single combination fusing and boring tool.

While this approach was found to yield highly satisfactory results, there remained a need for a fixture to efficiently carry out the boring and fusion step in combination with the proper alignment and positioning of the workpieces to be bonded. There further remained a need to provide a system to effectively employ this approach for multiple fusion operations, at least some of the operations including forming bores, in which a plurality of comparatively small thermoplastic items are fusion bonded to a relatively large or bulky fixed thermoplastic article, for example the body of an automobile gas tank or a tub for an automatic washing machine.

Devices for handling thermoplastic articles in bonding operations are known. For example, U.S. Pat. No. 3,809,737 (Rogers et al) discloses a process for forming plastic T connections including a hollow conduit, in which a portion of the skin of the main line protrudes into the branch line to increase the strength of the bond between the main line and branch line members.

U.S. Pat. No. 4,083,671 (Niederst et al) discloses a device for producing molded articles from foamable plastics, employing reciprocatory and rotary motion. A double-acting cylinder, hingedly mounted to a lower platen and to an upper platen near a hinged axle, controls movement of the upper platen toward and away from the lower platen, and pivotal movement of the upper platen after it reaches the upper limit of its linear movement. Another device for molding foamable plastics is disclosed in U.S. Pat. No. 4,015,920 (Niederst et al). A bipartite mold is secured to two movable clamping plates. One of the clamping plates can move through at least an angle of 180° from a parallel disposition relative to the other clamping plate.

Therefore, it is an object of the present invention to provide a fixture movable with respect to a fixed thermoplastic article, for aligning both a thermoplastic attachment and a heating platen with respect to the thermoplastic container and for selectively positioning the heating tool between the attachment and container.

Another object of the invention is to provide a fixture having independent means for supporting and reciprocating a thermoplastic workpiece and a fusion heating tool, respectively.

Yet another object of the invention is to provide a system for performing multiple fusion bonding operations joining a plurality of thermoplastic attachments to a relatively large and bulky thermoplastic article, while maintaining the article stationary.

SUMMARY OF THE INVENTION

To achieve these and other objects, there is provided an apparatus for forming a fusion bond between a fixed thermoplastic article and a movably supported thermoplastic attachment. The apparatus includes a mounting means for supporting a thermoplastic article, such as a container, in a fixed disposition. The apparatus further includes a heating tool having axially aligned inner and outer end segments, and a heating element means for selectively heating the inner and outer end segments. A fixture of the apparatus includes a base means, a first carrier reciprocably mounted with respect to the base means for supporting a thermoplastic attachment in a predetermined orientation with an end surface of the attachment facing the thermoplastic article. A first moving means reciprocates the first carrier to carry the thermoplastic attachment longitudinally toward and away from a generally transverse mating surface of the thermoplastic article. The fixture includes a second carrier reciprocably mounted with respect to the base means for supporting the heating tool in a select orientation. A second moving means reciprocates the second carrier means to move the heating tool longitudinally toward and away from the mating surface of the thermoplastic article. A third moving means reciprocates the second carrier generally transversely with respect to the base, to reciprocate the tool between an aligned position, i.e. between the thermoplastic article and attachment, to a remote position, i.e. removed from between these thermoplastic members, to permit longitudinal movement of the thermoplastic attachment toward the thermoplastic article to form an engagement of the end surface and mating surface for fusion bonding of the first and second articles.

Preferably the first carrier includes a gripping device for holding the thermoplastic attachment, and an elongate longitudinally extended ram supporting the gripping device. The first moving means can include a pneumatic cylinder fixed to the base means or base plate and reciprocably supporting the ram.

In one version of the invention, the second carrier includes a frame member, two spaced apart and parallel bars fixed to the frame member and disposed on opposite sides of the base means, and two bushing members, one slidably supporting each parallel bar. A transverse shaft is fixed to the bushings and supports them relative to the base plate. A coil spring is mounted in compression about each of the parallel bars and against the bushing member, so that the springs bias the parallel bars toward the base plate, thus biasing the heating tool against the end edge of the thermoplastic attachment whenever the second carrier is in the aligned position. Consequently the heating tool advances with the thermoplastic attachment and first carrier, and retracts under the influence of the springs as the first carrier is retracted.

In an alternative form of the invention, the second carrier includes a frame member supporting the tool and two spaced apart and parallel carrier arms fixed to the frame member and disposed on opposite sides of the base plate. A support structure connects the arms to a second elongate and longitudinally extended ram, such that the second moving means includes the supporting means, second ram and a second pneumatic cylinder mounted on the base plate to reciprocate the second ram. The support means can include a rotary actuator mounted on the base means and a transverse bar rotated by the actuator and fixed to the carrier arms, whereupon the support means provides part of the second moving means, and the third moving means in the form of a pivotal mounting of the carrier arms with respect to the second ram. An advantage of this approach is that the heating tool can be advanced and retraced independently of the first ram, which advances and retracts the thermoplastic attachment.

In some applications, the first and second temperatures of the respective heating tool end segments are substantially the same. On the other hand, for fusion operations including boring an opening through a container wall, the inner and outer end segments have predetermined, different transverse profiles, with the inner end segment having the smaller profile and higher temperature suited to the boring operation.

The apparatus advantageously incorporates a fixture mounting means for selectively positioning the base plate with respect to the fixed thermoplastic article, thus to position the fixture for subsequent alignment of the movable thermoplastic workpiece and heating tool.

One aspect of the invention involves providing a plurality of fixtures and mounting means in connection with a single fixed container. Then, an automobile gasoline tank, for example, may be provided with a variety of fusion bonded attachments simultaneously, e.g. a fuel tube, fuel pump enclosure, fuel return line, fuel level sensor sender, and fuel pump power leads. Similarly, inlet necks for hot and cold water and a water outlet can be simultaneously fused to the tank of an automatic washing machine.

Alternatively, the operations can be performed with a single fixture mounting means adapted for positioning a fixture in a variety of selected locations, in combination with a plurality of heating tools or interchangeable heating tool inserts, thus to form bores or fused areas on the container corresponding to the part to be bonded.

In accordance with the present invention, a single fixture supports a bondable thermoplastic part and a heating tool, and simultaneously positions and aligns these members with respect to a fixed thermoplastic article. During a preliminary fusing stage which also may involve boring through the container wall, the fixture positions the tool in alignment with the thermoplastic workpiece, between the workpiece and fixed container. Immediately after fusing, both the tool and workpiece are retracted slightly, and the tool carrier is pivoted out of its alignment with the tool, permitting the movable workpiece to be advanced directly into engagement with the fixed container, thus completing the fusion bond. These steps can be performed rapidly, with no movement of the container and no more than longitudinal reciprocation of the movable workpiece, thus to reduce processing time and enhance the quality of the fusion bond.

IN THE DRAWINGS

For a further understanding of the above and other features and advantages, reference is made to the following detailed description of the preferred embodiments, and to the drawings, in which.

DETAILED DESCRIPTION OF THE PREFERRED EMBODIMENTS

Figures 1, 2:
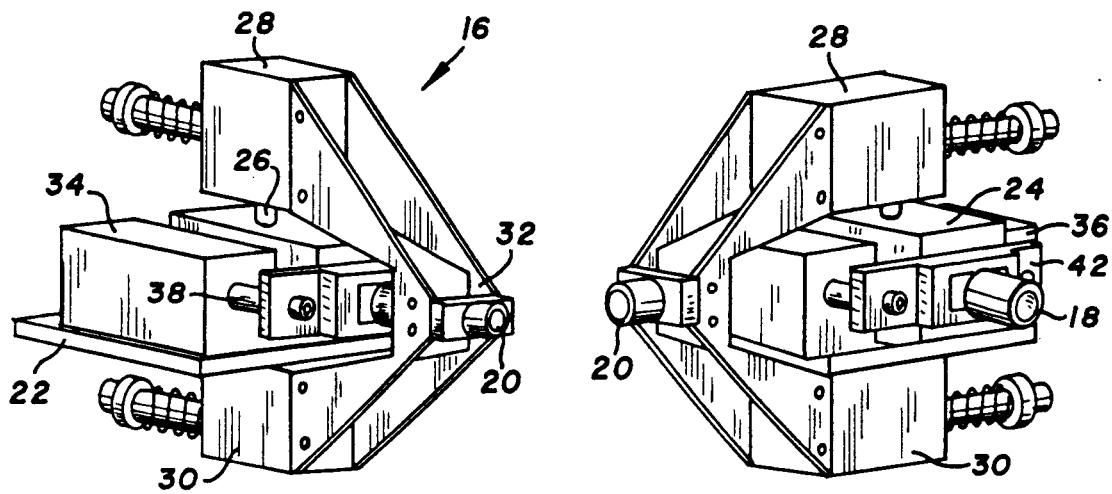
FIG. 1 is a perspective view of a fixture constructed in accordance with the present invention.
FIG. 2 is a perspective view of the fixture in FIG. 1, showing a platen carrier of the fixture in an alternative position.

Turning now to the drawings, there is shown in FIGS. 1-5 a fixture 16 adapted for simultaneously supporting a thermoplastic workpiece, for example a spout 18, and a heating and bore forming tool 20, for example of the type disclosed in U.S. Pat. No. 4,872,935, filed Nov. 28, 1988, assigned to the assignee of the present application. Fixture 16 includes a base plate 22 which is maintained stationary during fusion bonding operations. A rotary actuator 24 is mounted to the base plate.

A transverse shaft 26, vertical as shown in FIGS. 1 and 2, extends through and is rotated by actuator 24. Upper and lower bushing members 28 and 30 are fixed to opposite ends of transverse shaft 26 respectively above and below rotary actuator 24, and thus rotate with the shaft. Mounted to bushing members 28 and 30 is a platen carrier assembly which supports tool 20 at its forward or outer end 32.

A pair of pneumatic cylinders 34 and 36 are mounted to base plate 22 on opposite sides of pneumatic rotary actuator 24. Elongate and parallel rams 38 and 40 are reciprocably mounted in cylinders 34 and 36, respectively, for simultaneous longitudinal reciprocation relative to base plate 22. At their outer ends, rams 38 and 40 support a gripping device 42, on which is mounted thermoplastic spout 18.

As seen from FIG. 2, the tool carrier assembly including a platen carrier 44, bushing members 28 and 30, and transverse shaft 26, is rotatable approximately 90° to selectively position tool 20 either in an aligned position as in FIG. 1, or in a remote position removed from between spout 18 as in FIG. 2.

Figure 3:
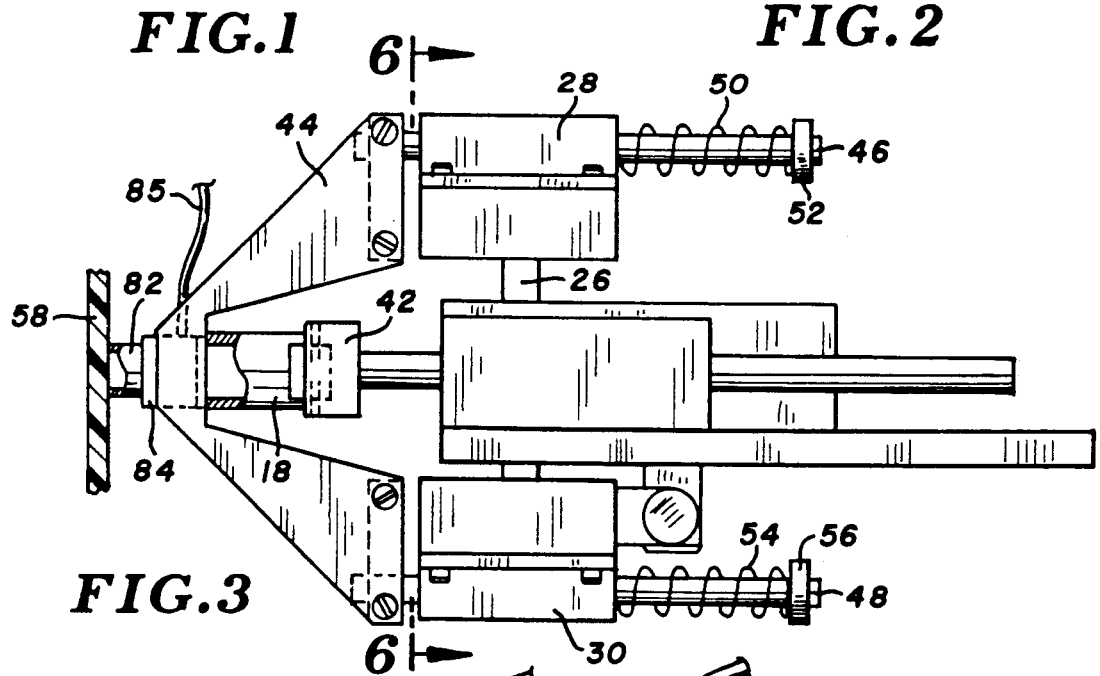
FIG. 3 is a partially sectioned side view of the fixture.

As seen in FIG. 3, platen carrier 44 is mounted reciprocably with respect to bushing members 28 and 30 by respective upper and lower elongate bars 46 and 48. A coil spring 50 surrounds bar 46 and is maintained under compression between bushing member 28 and a retaining member 52 fixed to the bar. A coil spring 54 and retainer 56 are likewise mounted on lower bar 48. Consequently, platen carrier 44 is continually urged against the forward Walls of bushing members 28 and 30. With carrier 44 in the aligned position as shown in FIGS. 1 and 3, rams 38 and 40 can be advanced to position spout 18 against the rearward surface of tool 20, whereupon further advancing of the rams also advances bars 46 and 48 with respect to their respective bushings, thus to advance tool 20 and spout 18 simultaneously until the forward end of the bore forming and fusing tool abuts a wall segment 58 of a thermoplastic container. Should rams 38 and 40 be retracted to withdraw spout 18, tool 20 is withdrawn as well under the force of springs 50 and 54.

Figure 6:
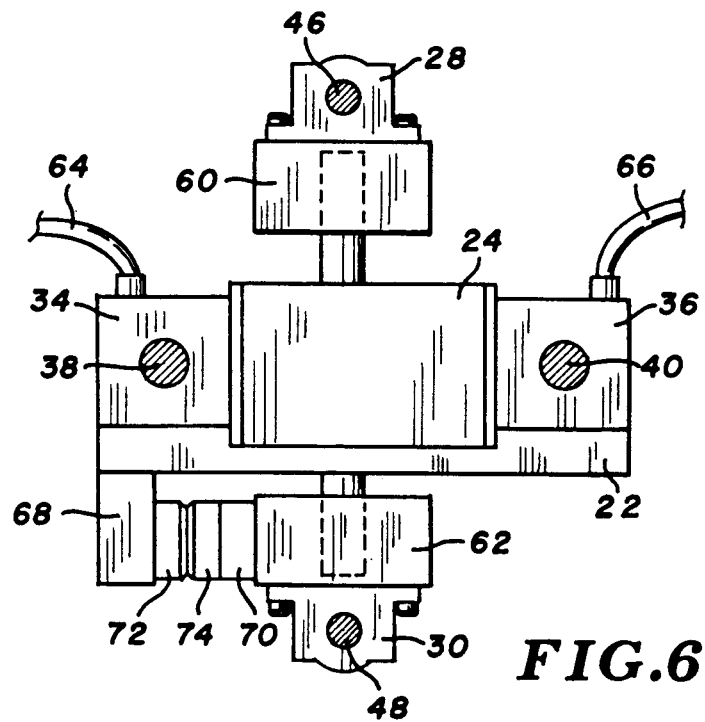
FIG. 6 is an end sectional view of the fixture.

FIG. 6 illustrates the positioning of cylinders 34 and 36 and rotary actuator 24 relative to base plate 22, and further the positioning of bushing members 28 and 30, supported on blocks 60 and 62, respectively, with respect to the rotary actuator. Supply lines to the pneumatic cylinders are shown at 64 and 66.

Also illustrated in this figure is a means to ensure positioning of platen carrier 44 in its alignment position, including a lobe 68 depended downwardly of base plate 22, a lobe 70 integral with bushing supporting block 60, and detent members 72 and 74 mounted on lobes 68 and 70, respectively. Detent members 72 and 74 engage when the platen carrier and integral assembly, having been pivoted away from the remote position, arrive at the aligned position, and thus prevent further pivoting in that direction out of alignment.

Figure 4:
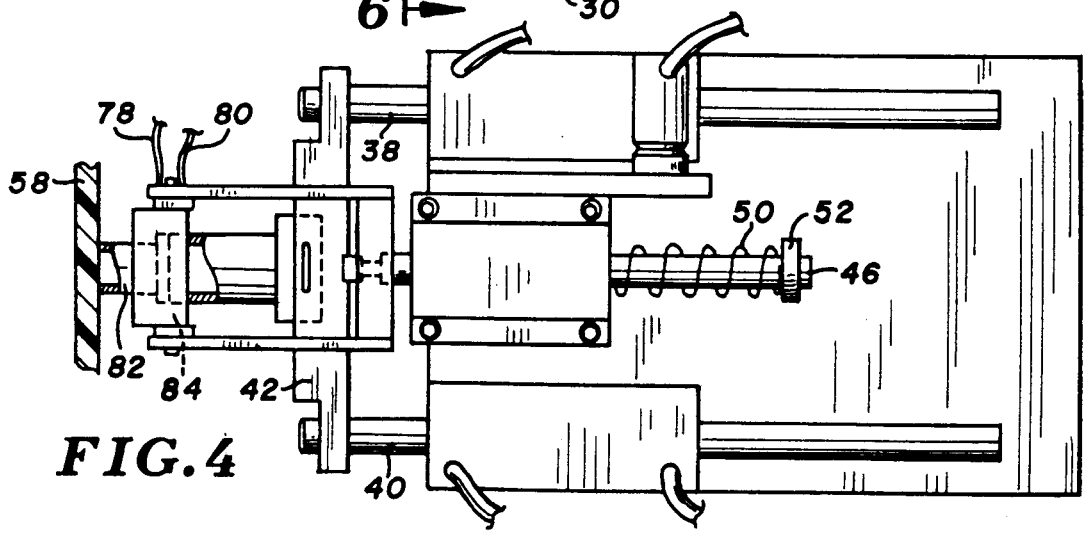
FIG. 4 is a partially sectioned top view of the fixture.
Figure 5:
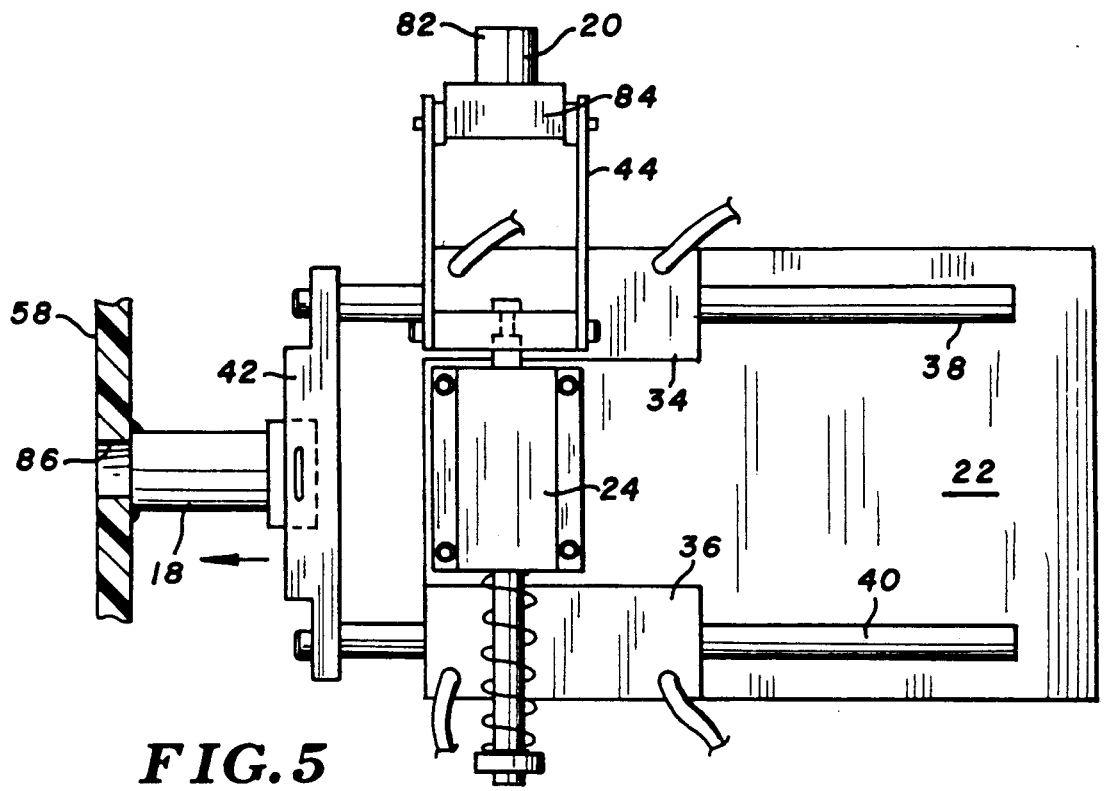
FIG. 5 is a view similar to that in FIG. 4 but with the platen carrier in the position shown in FIG. 2.

FIGS. 4 and 5 are top views of the fixture illustrating the alternative aligned and remote positions, and further illustrating use of the fixture in fusion bonding spout 18 to wall segment 58. In FIG. 4, tool 20 and spout 18 are aligned, with the forward end of heating tool 20 abutting wall segment 58 along a predetermined mating surface of the wall. A forward end surface of spout 18 is engaged with the rear surface of the tool, to be heated by tool 20 as the tool is heating wall segment 58.

Tool 20 is heated by electrical elements receiving power over lines 78 and 80. As tool 20 is intended for forming a bore as well as fusing, a forward end section 82 of the tool is heated to a higher temperature than rearward end section 84. Forward section 82 also has a reduced diameter or transverse profile, thus to determine the desired profile of the bore.

With the fixture arranged as in FIG. 4, heat is supplied to tool 20 and the tool is advanced slowly to form a bore through wall segment 58. The tool and spout are further advanced until rearward section 84 of the tool lies against wall segment 58, heating the wall segment over a rim area around the bore, simultaneously with the heating of spout 18. A vacuum line 85, in fluid communication with tool 20, draws a vacuum in forward end section 82 for retaining with the tool a slug created when forming the bore through wall segment 58.

Once the rim portion and spout are sufficiently heated, and with the slug still retained in forward section 82, rams 38 and 40 are retracted to withdraw tool and spout. Rams 38 and 40 are retracted slightly beyond the point at which carrier 44 engages bushing members 28 and 30, freeing the carrier and tool for pivotal movement by rotary actuator 24, to the removed position as shown in FIG. 5. Then, rams 38 and 40 are advanced one again, sufficiently to position the forward end surface of spout 18 against the heated rim area around a bore 86 formed through the wall segment. The spout is maintained in this position until sufficient cooling has occurred in order to solidify the fusion bond. In lieu of vacuum line 85, a mechanical means can be provided to retain the slug, for example a spring loaded barb or the like.

Figure 7:
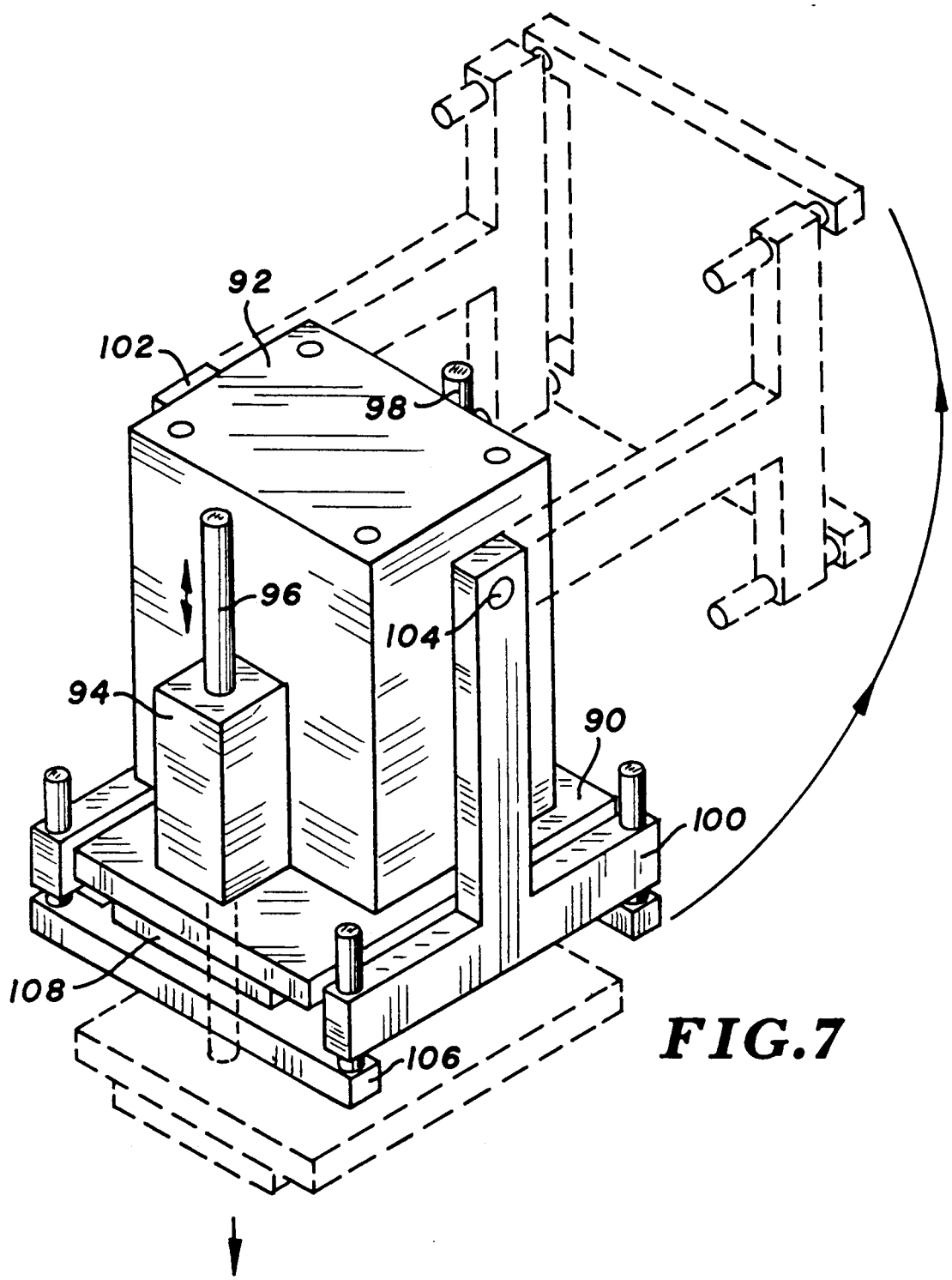
FIG. 7 is a perspective view of an alternative embodiment fixture.

FIG. 7 illustrates an alternative embodiment fixture in which a base plate 90 supports a pneumatic rotary actuator 92 and a pair of pneumatic cylinders on opposite sides of the actuator, one of which is shown at 94. A ram 96 is supported slidably in pneumatic cylinder 94, with a corresponding ram 98 supported similarly in the other pneumatic cylinder.

A pair of pivoting, tool supporting arms 100 and 102 are pivotally mounted to rotary actuator 92 on a shaft 104, and support a heating platen 106. A thermoplastic part 108 is reciprocably mounted relative to base plate 90 through rams 96 and 98.

Figure 8:
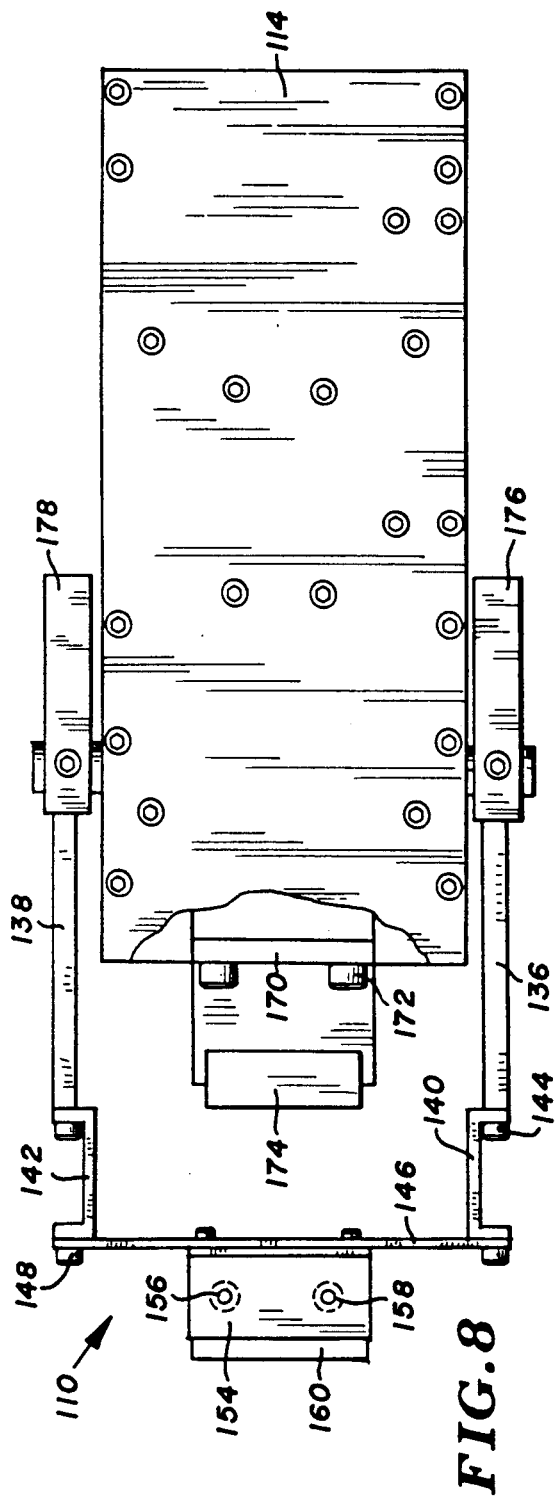
FIG. 8 is a top view of another alternative embodiment fixture.
Figure 9:
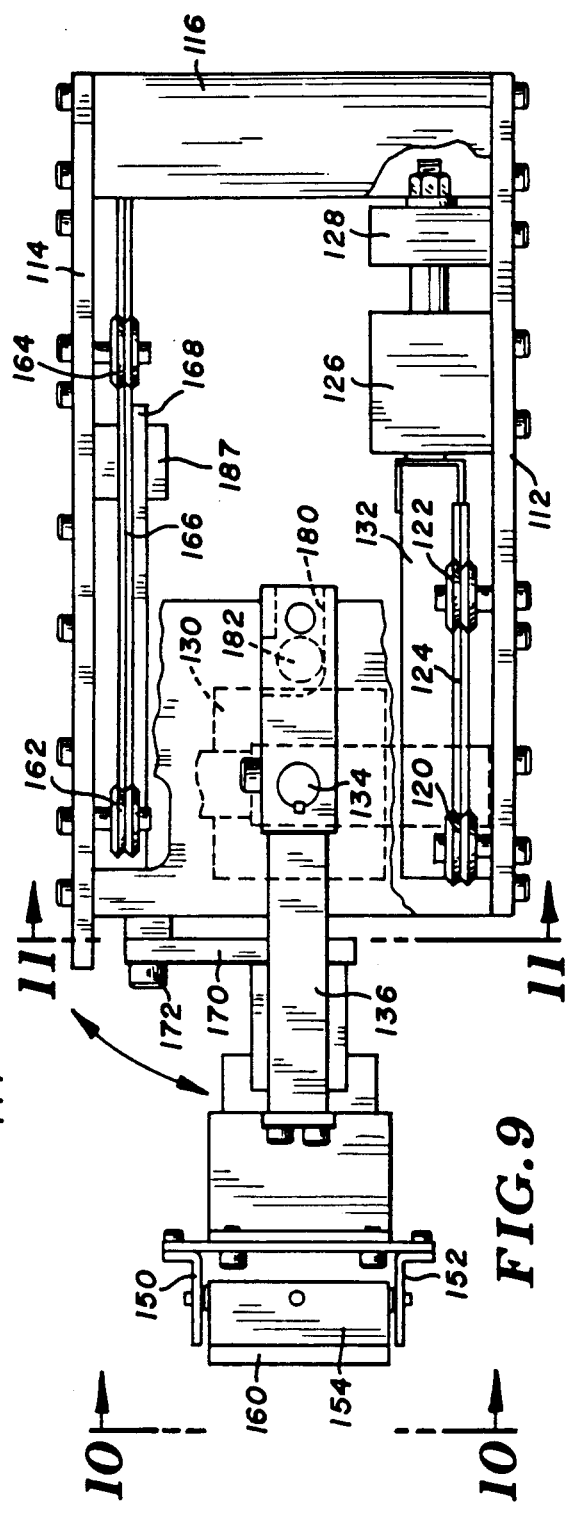
FIG. 9 is a side elevational view of the fixture in FIG. 8.

FIGS. 8 and 9 show another alternative embodiment fixture 110 in top and side views, respectively. The portion of fixture 110 normally stationary during fusion operations includes a base or bottom plate 112, a top plate 114 and side plates 116 and 118 connected between the top and bottom plates. Four lower grooved guide wheels, two of which are shown at 120 and 122, are mounted rotatably with respect to bottom plate 112 and support a platen advance rail assembly including an elongate rail 124 for longitudinal (i.e. forward and rearward) movement relative to the bottom plate. A pneumatic cylinder 126 drives the platen advance rail assembly. A cylinder stop 128 is optional, and if included is mounted to the end of the shaft reciprocated by cylinder 126, opposite to that attached to the rail assembly.

A pneumatic rotary actuator 130 is mounted on an elongate actuator slide bar 132, which in turn is fixed to rail 124 so that the rotary actuator travels longitudinally with the rail. A transverse shaft 134, rotatable in the rotary actuator, supports a pair of parallel platen supporting arms 136 and 138. Spacers 140 and 142, secured to arms 136 and 138 respectively by fasteners 144, support a platen carrier 146 for arcuate travel with arms 136 and 138 as they are pivoted by the rotary actuator. Platen carrier 146 is fastened to the spacers by fasteners 148.

A pair of generally L-shaped platen mounting members 150 and 152 are secured respectively to the upper and lower ends of platen carrier 146, and support a platen 154 which can be heated to a selected temperature by providing electrical energy to a pair of heating elements 156 and 158. A platen insert 160 is removably secured to the platen, and has a transverse profile which determines the shape of the surface to be heated on a thermoplastic container or other fixed thermoplastic article. Although not illustrated, a second platen insert may be mounted to platen 154 on the opposite side of the platen from platen insert 160, with a transverse profile to determine the shape of the surface to be heated on workpiece 174. The platen inserts can be constructed of stainless steel, and preferably have nonstick surfaces for contacting the thermoplastic members, for example due to a high degree of polishing or the application of a surface coating of Teflon (brand name) or similar material.

Four upper groove guide wheels mounted rotatably with respect to the top plate, two of which are illustrated at 162 and 164, support an elongate workpiece advance rail assembly including a rail 166 for longitudinal reciprocal movement with respect to the top plate. Like the bottom guide wheels, the top guide wheels have a V-shaped groove corresponding to inclined outside edges of the rails, thus to effectively guide and confine the rails to longitudinal travel.

An elongate, longitudinally extended upper slide bar 168 is integral with rail 166 and supports a vertically disposed gripper plate 170, attached to the slide bar by fasteners 172. The gripper plate in turn supports a thermoplastic workpiece or attachment 174, for longitudinal travel with the slide bar and rail.

As indicated by the arrows in FIG. 9, platen support arms 136 and 138 travel in an arcuate path between an aligned position which is horizontal as viewed in the figure, and an upright or removed position. To prevent downward or counterclockwise travel of the arms beyond the advanced position, arms 136 and 138 are respectively provided with stop blocks 176 and 178. Each stop block is provided with a groove open inwardly toward the fixture, e.g. as indicated at 180 in connection with stop block 176. A detent 182, integral with side plate 116, projects outwardly of the side plate and into groove 180 when arm 136 is horizontal, abutting a lower edge of the groove to prevent further counterclockwise travel of the arm. A similar groove and detent, not illustrated, are provided in connection with arm 138.

Figure 10:
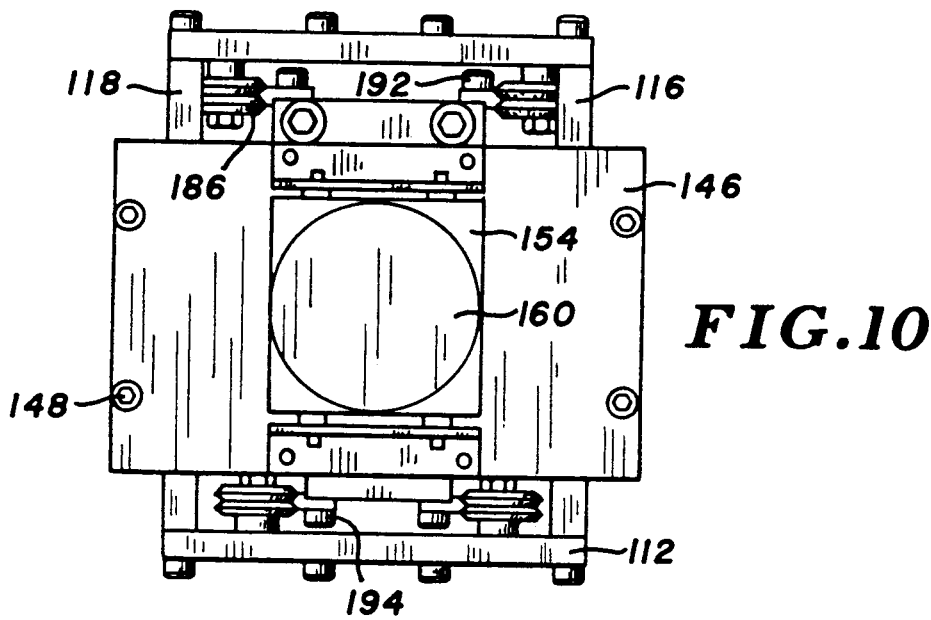
FIG. 10 is an end view of the fixture.
Figure 11:
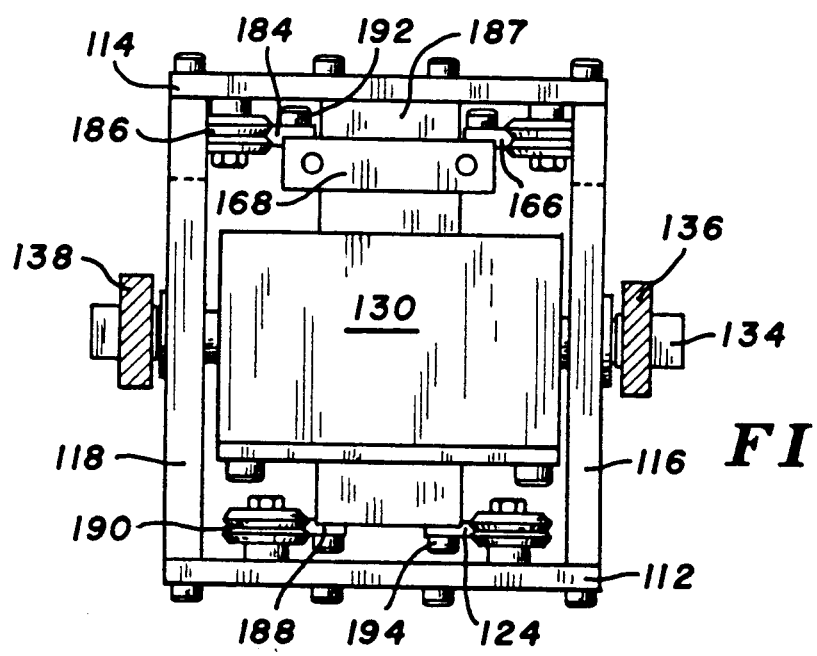
FIG. 11 is an end sectional view of the fixture.

As seen in FIGS. 10 and 11, the workpiece advance rail assembly includes two elongate and opposite rails 166 and 184. Rail 166 is engaged with guide wheels 162 and 164, while rail 184 is similarly engaged with an opposite pair of guide wheels, one of which is shown at 186. A pneumatic cylinder 187, mounted to top plate 114, drives the upper rail assembly. Similarly, the platen advance rail assembly includes opposite rails 124 and 188 respectively engaged with guide wheels 120 and 122, and with a guide wheel 190 and fourth wheel not illustrated. Fasteners 192 secure upper slide bar 168 to rails 166 and 184, while fasteners 194 secure lower rails 124 and 188 to actuator slide bar 132.

Thus, with two linear actuators and one rotary actuator, workpiece 174 is longitudinally reciprocable while platen 154 is both longitudinally and arcuately reciprocable. Accordingly, a fusion bonding process proceeds as follows.

First, with platen support arms 136 and 138 horizontal, the lower rail assembly is longitudinally advanced to position platen insert 160 against a selected mating surface area of a thermoplastic container or other fixed thermoplastic article. Next, the upper rail assembly is advanced to position workpiece 174 against the rearward surface of platen 154, through an opening in the platen carrier. Electrical energy is supplied to platen heating elements 156 and 158, to simultaneously heat the mating surface and the forward edge of workpiece 174, with the platen and platen insert heated to a sufficient temperature to fuse the respective edge and mating surfaces. The platen and insert are heated to a temperature above the fusion temperature of the thermoplastic article and workpiece, for example 600° F. in the case of polypropylene. The heating step may take approximately fifteen seconds.

Once the surfaces are fused, the rail assemblies are retracted a sufficient distance to separate the platen and platen insert from the fixed article and workpiece, whereupon rotary actuator 130 pivots arms 136 and 138 to transfer the platen and platen insert arcuately away from its aligned position between the fixed article and workpiece. Immediately upon this withdrawal, the lower rail assembly is advanced until the mating surface and workpiece edge surface engage, and the engagement is maintained a sufficient length of time to permit the fused material to cool and solidify, thus forming the fusion bond. The time for engagement during cooling of the fusion bond is typically about ten seconds.

As compared to the embodiment described in connection with FIGS. 1-6, this alternative embodiment differs in utilizing a linear actuator to drive the actuator advance rail assembly. The advantage afforded by this approach is the ability to control platen positioning and travel independently of the positioning and travel of the workpiece and its supporting structure. Further, this arrangement facilitates a more rapid withdrawal of the platen and subsequent engagement of the workpiece and fixed article for fusion. It requires only a partial retraction of the workpiece and platen, as opposed to the essentially complete withdrawal of these members required to position carrier 44 against bushing members 28 and 30, in connection with fixture 16.

Finally in connection with FIGS. 8-11, it is to be recognized that although fixture 110 is described in connection with a simple fusion bonding step in which the platen and platen insert are substantially evenly heated, it can, as well, be employed in connection with the fusing and bore forming tool described in the aforementioned patent application Ser. No. 07/276,888, in which event the bore forming portion of the tool is heated to a substantially higher temperature, for example 800° F. when the thermoplastic involved is polypropylene.

Figure 12:
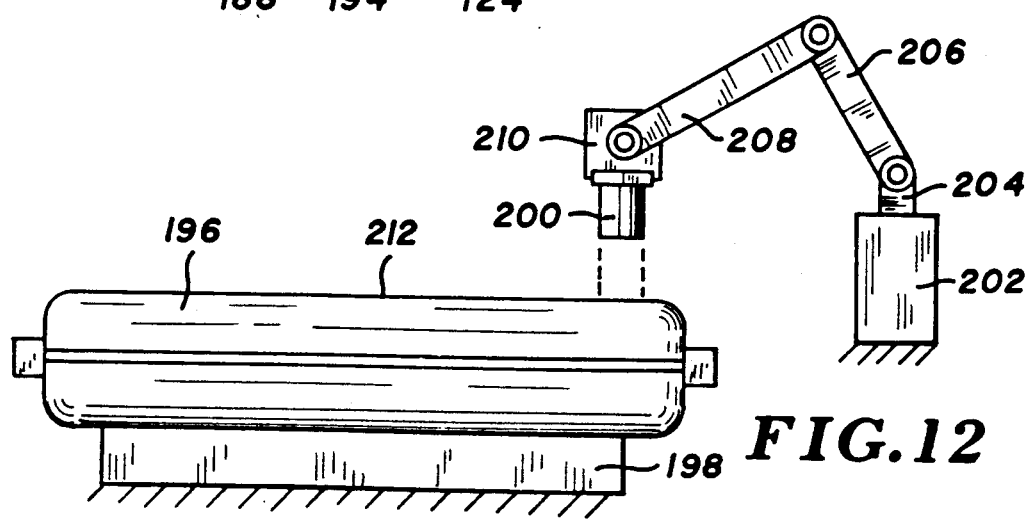
FIG. 12 is an elevation of a system including a fixture constructed in accordance with the present invention, operably supported relative to a fixedly supported thermoplastic container.

FIG. 12 illustrates a system for attaching a variety of fusible thermoplastic parts to a fixed thermoplastic article, for example an automobile fuel tank 196 secured integrally on a platform 198. A fixture 200, similar to fixture 110 or one of the other fixture embodiments, is supported on a fixture positioning device including a base 202 and a standard 204 fixed to the base, an arm 206 mounted pivotally to the standard, and an arm 208 mounted pivotally to arm 206 and to a head 210 supporting the fixture. Thus, head 210 and fixture 200 are positionable in any desired orientation and movable over a top surface 212 of fuel tank 196, from left to right as viewed in the figure. It is to be appreciated that further equipment, well known in the art, may be employed to translate the head and fixture in other directions. Accordingly, in combination with a plurality of interchangeable platen inserts and interchangeable heating tools for respective fusion bonding and fusion bonding/bore forming operations, device can be employed to fusion bond a variety of spouts and other attachments to fuel tank 196, each at a predetermined location.

Alternatively, a plurality of devices similar to device may be employed in connection with a single fixed thermoplastic article, for simultaneous fusion bonding of several thermoplastic attachments, thereby rapidly achieving the plurality of bonds necessary for complete assembly of a fuel tank, automatic washing machine tank, or the like. Thus, in accordance with the present invention, single or multiple fusion bonding operations can be performed on a single, relatively large or bulky thermoplastic article, with each of the bonds performed with a fixture which selectively positions a fusion or fusion and bore forming tool and a thermoplastic attachment, both with respect to the thermoplastic article, all while the article remains stationary.

What is claimed is:

1. An apparatus for forming a fusion bond between a fixed thermoplastic article and a movably supported thermoplastic attachment, comprising:
   a mounting means for supporting a thermoplastic article in a fixed disposition;
   a heating tool including axially aligned inner and outer end segments, and a heating element means for selectively heating said inner and outer end segments to respective first and second selected temperatures; and
   a fixture including a base means, a first carrier reciprocably mounted with respect to the base means for supporting a thermoplastic attachment in a predetermined orientation with an end surface of the thermoplastic attachment facing said thermoplastic article, a first moving means mounted to the base means for reciprocating said first carrier to move said thermoplastic attachment longitudinally toward and away from a generally transverse mating surface of said thermoplastic article, a second carrier reciprocably mounted with respect to the base means for supporting said heating tool in a select orientation, a second moving means mounted to the base means for reciprocating said second carrier to move said heating tool longitudinally toward and away from said mating surface of said thermoplastic article, and a third moving means operatively coupled to the second carrier for reciprocating said second carrier generally transversely with respect to said base means to move said tool between an aligned position between said thermoplastic article and thermoplastic attachment, and a remote position removed from between said article and attachment, to permit longitudinal movement of said thermoplastic attachment toward said first thermoplastic article to form an engagement of said end surface and mating surface for fusion bonding of said first and second articles.

2. The apparatus of claim 1 wherein:
said first carrier comprises a gripping device, and said first moving means includes an elongate, longitudinally extended first ram means integral with said gripping device, and a pneumatic cylinder fixed with respect to said base means and reciprocably supporting said ram.

3. The apparatus of claim 2 wherein:
said second carrier includes a carrier frame member, two spaced apart and parallel bars fixed to the frame member and disposed on opposite sides of said base means, and a bushing member associated with each bar and slidably supporting its associated bar.

4. The apparatus claim 3 wherein:
said third moving means comprises a transverse shaft fixed to said bushing member, and a rotary actuator mounted on said base means and rotatably supporting said shaft.

5. The apparatus of claim 4 wherein:
said second moving means includes a spring associated with each of said transverse bars and on its associated parallel bar against its associated bushing member, said springs biasing said parallel bars toward said base plate, thereby to urge said heating tool against said end edge of said second thermoplastic article whenever said second carrier is in said aligned position, whereby said heating tool advances along with said second thermoplastic article as said first carrier is advanced, and retracts in response to the force of said springs upon retraction of said first carrier.

6. The apparatus of claim 2 wherein:
said second carrier includes a platen carrier frame member, two parallel and spaced apart elongate arms fixed to the frame member and disposed on opposite sides of said base means, a second ram means mounted reciprocably to said base means, and a support means for mounting said arms to reciprocate with said second ram means.

7. The apparatus of claim 6 wherein:
said support means includes a rotary actuator mounted on said second ram means to reciprocate with said second ram means, and a transverse shaft fixed to said carrier arms and rotatably supported in said rotary actuator, said shaft being rotatable whereby said third moving means comprises said rotary actuator and shaft.

8. The apparatus of claim 7 wherein:
said first and second moving means comprise first and second pneumatic cylinders mounted to said base means and operable to reciprocate said first and second ram means, respectively.

9. The apparatus of claim 8 wherein:
said first and second ram means comprise first and second elongate rails, respectively, said fixture further including a first spaced apart guide means on opposite sides of said first rail and a plurality of spaced apart second guide means mounted to the base means on opposite sides of said second elongate rail, each of said first and second guide means having grooves conforming to the edges of said first and second rails to facilitate longitudinal travel of said rails.

10. The apparatus of claim 1 wherein:
said first and second temperatures are substantially the same.

11. The apparatus of claim 1 wherein:
said inner and outer end segments of said heating tool have predetermined first and second transverse profiles, respectively, said heating tool is longitudinally advanced sufficiently to advance the inner end segment, when heated, against and through a wall section of said second thermoplastic article defining said mating surface to form a bore through said first thermoplastic article having substantially said first selected profile, and wherein said first selected temperature is at least 200° F. greater than said second selected temperature.

12. The apparatus of claim 1 further including:
a fixture mounting means for selectively positioning said base means with respect to said first thermoplastic article.

13. The apparatus of claim 1 further including:
a stop means having a first portion mounted to said second carrier and a second portion mounted to said base means, for engaging one another to prevent further movement of said second carrier upon its reaching said aligned position.

14. The apparatus of claim 1 wherein:
said heating tool includes a rigid, metallic heating platen, and a rigid metal insert removably mounted to the platen and having a predetermined profile for engaging said mating surface and heating a portion of said mating surface corresponding to said predetermined profile.

15. In an apparatus for the fusion bonding of a first end surface of a first thermoplastic component onto a mating surface of a second thermoplastic component, said second thermoplastic component having a surface for receiving said first thermoplastic component in fusion bonded relationship thereon and wherein a first fusion operation is being undertaken on said first thermoplastic component while a second fusion operation is being undertaken on said second thermoplastic component generally adjacent the receiving surface thereof, the system being such that said first and second fusion operations are undertaken substantially simultaneously in an ongoing single operational cycle; said apparatus comprising:
  (a) a mounting means fixedly supporting a first thermoplastic component part, fixture means for releasably retaining a second component part fabricated from thermoplastic fusion bondable material in a first spaced apart disposition relative to the first part for undertaking fusion operations and in a second mating disposition for bonding contact of said component parts;
  (b) first carrier means mounted to the fixture means, heated platen means mounted on said fixture means through said first carrier means and including first and second heated dies secured to opposed ends of said platen means, said first carrier means supporting said first heated die for undertaking said first fusion operation on said first thermoplastic component and supporting said second heated die for undertaking said second fusion operation on said second thermoplastic component while said first and second thermoplastic components are in said first spaced apart disposition;
  (c) second carrier means mounted to the fixture means controllably accomplishing reciprocatory to-and-fro movement of said second thermoplastic component part from said first spaced apart disposition to said second mating disposition, while said first carrier means rotatably pivots said heated platen means from between said thermoplastic components to a remote disposition;
  (d) said heated platen means including a heat source coupled to said first heated die for producing a first elevated temperature along those certain portions contacting said first thermoplastic component and for producing a second elevated temperature along those certain surfaces contacting said second thermoplastic component, and wherein said second elevated temperature is significantly higher than said first elevated temperature.

16. In a system for the fusion bonding of an annular end surface of a first thermoplastic component onto a mating annular surface generally surrounding a bore formed in a second thermoplastic component, the system being such that the bore forming, component fusion and component bonding steps are undertaken in an ongoing signal operation; said system comprising:
  (a) mounting means and fixture means for respectively retaining first and second thermoplastic component parts in a predetermined spaced apart disposition and for reciprocating the component parts relative to each other;
  (b) heated platen means including first and second heated dies, said first heated die arranged for forming a bore in said second thermoplastic component, and said second heated die arranged to provide thermal energy to fuse an annular end surface of said first thermoplastic component, said first and second heated dies being arranged in generally oppositely disposed relationship to one another along opposed surfaces of said heated platen means;
  (c) a carrier means mounted to the fixture means for controllably positioning said heated platen means relative to said fixture means and for accomplishing relative movement thereof between said bore forming and fusion step and said component bonding step;
  (d) said heated platen means including a heat source coupled to said first heated die for producing a first elevated temperature along said bore forming portions contacting said first thermoplastic component and for producing a second elevated temperature along those certain surfaces contacting said second thermoplastic component, and wherein said first elevated temperature is significantly higher than said second elevated temperature.

* * * * *